US005807661A

United States Patent [19]

Landry-Coltrain

[11] Patent Number: 5,807,661

[45] Date of Patent: Sep. 15, 1998

[54] TRANSPARENT LUBRICIOUS OVERCOAT CONTAINING FLUOROPOLYMER MICROPARTICLES FOR TRANSPARENT MAGNETIC RECORDING LAYER FOR PHOTOGRAPHIC ELEMENT

[75] Inventor: Christine J. T. Landry-Coltrain, Fairport, N.Y.

[73] Assignee: Eastman Kodak Company, Rochester, N.Y.

[21] Appl. No.: 789,145

[22] Filed: Jan. 28, 1997

[51] Int. Cl.[6] .............................. G03C 1/76; G11B 5/708

[52] U.S. Cl. .......................... 430/523; 430/496; 430/501; 430/140; 428/694 BP; 428/694 BF; 428/695

[58] Field of Search .................................... 430/523, 496, 430/501, 140; 428/694 BP, 694 BF, 695

[56] References Cited

U.S. PATENT DOCUMENTS

| | | | |
|---|---|---|---|
| 3,862,860 | 1/1975 | Pardee et al. | 427/352 |
| 3,998,989 | 12/1976 | Pardee et al. | 428/409 |
| 5,147,768 | 9/1992 | Sakakibara | 430/501 |
| 5,217,804 | 6/1993 | James et al. | 428/329 |
| 5,252,444 | 10/1993 | Yamada et al. | 430/503 |
| 5,434,037 | 7/1995 | Wexler et al. | 430/496 |
| 5,531,913 | 7/1996 | Nair et al. | 252/62.53 |

FOREIGN PATENT DOCUMENTS

| | | | |
|---|---|---|---|
| 0 552 617 | 7/1993 | European Pat. Off. | G03L 1/85 |

OTHER PUBLICATIONS

Research Disclosure 34390, Nov. 1992.

Research Disclosure 17643, Dec. 1978, “Photographic Silver Halide Emulsions, Preparations, Addenda, Processing and Systems” J. W. Carpenter et al., pp. 22–31.

Research Disclosure 36544, Sep. 1994, “Photographic Silver Halide Emulsions, Preparations, Addenda, System and Processing”, pp. 501–540.

*Primary Examiner*—Mark F. Huff
*Attorney, Agent, or Firm*—Carl F. Ruoff

[57] ABSTRACT

The present invention is a photographic element which includes polyester film support and at least one light-sensitive silver halide layer on a front side of the support. An antistatic layer is superposed on the backside of the support. A transparent magnetic recording layer is superposed on the backside of the support. A protective lubricating overcoat layer is superposed on the backside of the support, the antistatic layer being closest to the support and the overcoat layer being furthest from the support. The protective lubricating overcoat layer includes fluorinated ethylene polymer particles having a mean particle size of from 0.01 to 0.5 $\mu$m, abrasive particles having a Mohs scale hardness of 6 or more and a median diameter of from 0.1 to 0.4 $\mu$m, and a transparent binder.

14 Claims, No Drawings

TRANSPARENT LUBRICIOUS OVERCOAT CONTAINING FLUOROPOLYMER MICROPARTICLES FOR TRANSPARENT MAGNETIC RECORDING LAYER FOR PHOTOGRAPHIC ELEMENT

FIELD OF THE INVENTION

This invention relates to photographic elements and more particularly to photographic elements having a light-sensitive silver halide layer, a transparent magnetic recording layer, and a transparent lubricious overcoat layer.

BACKGROUND OF THE INVENTION

U.S. Pat. Nos. 3,862,860 and 3,998,989 describe the use of tetrafluoroethylene telomer in combination with a copolymer of vinyl chloride and trifluorochloroethylene for improving lubricity and abrasion resistance of photographic films. However, these patents teach that tetrafluoroethylene telomer is only soluble in highly fluorinated solvents. Such highly fluorinated solvents are environmentally unacceptable and not suitable for coating large quantities of photographic film and paper.

U.S. Pat. Nos. 5,252,441 and 5,217,804 disclose magnetic particles and transparent magnetic recording layers for photographic elements wherein magnetic particles are coated with a low refractive index material to improve the transparency of the transparent magnetic layer. Listed low refractive index materials include all types of fluorinated compounds. However, these low refractive index materials are in the magnetic layer and at too low of a concentration to provide any lubricity benefits.

In general, the fluorinated polymer materials described in photographic elements do not provide increased lubricity. For example, in EP 0552617, a layer containing a mixture of a metallic oxide sol and a fluorine-containing copolymer is described. However, this layer is not an outermost layer and an outermost layer which includes wax is required to provide lubricity.

SUMMARY OF THE INVENTION

The present invention is a photographic element which includes polyester film support and at least one light-sensitive silver halide layer on a front side of the support. An antistatic layer is superposed on the backside of the support. A transparent magnetic recording layer is superposed on the backside of the support. A protective lubricating overcoat layer is superposed on the backside of the support, the antistatic layer being closest to the support and the overcoat layer being furthest from the support. The protective lubricating overcoat layer includes fluorinated ethylene polymer particles having a mean particle size of from 0.01 to 0.5 μm, abrasive particles having a Mohs scale hardness of 6 or more and a median diameter of from 0.1 to 0.4 μm, and a transparent binder.

DETAILED DESCRIPTION OF THE PREFERRED EMBODIMENTS

The present invention provides a transparent lubricious overcoat for a magnetic recording layer in the backside of a photographic film. The lubricious overcoat layer includes a polymeric binder, fluoropolymer microparticles as the lubricant, and hard inorganic oxide abrasive particles for wear resistance. The preferred polymeric binder is a material that has excellent adhesion to the polymeric binder of the magnetic recording layer. The fluoropolymer microparticles are in the form of submicron size particles which may be provided as a dispersion in water or as micropowders. Preferred fluoropolymers are Teflon FEP 120, MP1100, and MP1150 from DuPont. The abrasive particles are silicon oxide or aluminum oxide particles of about 0.1 to 0.4 μm in size. The present invention provides a layer which offers good lubricity, good runability against a magnetic head and no transfer of the lubricant to the surface on the opposite side of the film packages at high temperatures. In addition, the process of forming this layer is through solvent coating in which the binder is soluble in the solvent.

The base support for the present invention can be cellulose derivatives such as a cellulose ester, cellulose triacetate, cellulose diacetate, cellulose acetate propionate, polyesters, such as polyethylene terephthalate or polyethylene naphthalate, poly-1,4-cyclohexanedimethylene terephthalate, polybutylene terephthalate, and copolymers thereof, polyimides, polyamides, polycarbonates, polystyrene, polyolefins, such as polyethylene, polypropylene, polysulfones, polyarylates, polyether imides and blends of these.

The photographic elements according to this invention can contain one or more conducting layers such as antistatic layers and/or antihalation layers such as described in Research Disclosure, Vol. 176, December 1978, Item 17643 to prevent undesirable static discharges during manufacture, exposure and processing of the photographic element. Antistatic layers conventionally used for color films have been found to be satisfactory herewith. Any of the antistatic agents set forth in U.S. Pat. No. 5,147,768 which is incorporated herein by reference may be employed. Preferred antistatic agents include metal oxides, for example tin oxide, antimony doped tin oxide and vanadium pentoxide. These anitstatic agents are preferably dispered in a film forming binder.

The magnetic particles in the transparent magnetic layer can be ferromagnetic iron oxides, such as $\gamma$-$Fe_2O_3$, $Fe_3O_4$ $\gamma$-$Fe_2O_3$ or $Fe_3O_4$ with Co, Zn or other metals in solid solution or surface treated or ferromagnetic chromium dioxides, such as $CrO_2$ or $CrO_2$ with metallic elements, for example Li, Na, Sn, Pb, Fe, Co, Ni, and Zn, or halogen atoms in solid solution. Ferromagnetic pigments with an oxide coating on their surface to improve their chemical stability or dispersability, as is commonly used in conventional magnetic recording, may also be used. In addition, magnetic oxides with a thicker layer of lower refractive index oxide or other material having a lower optical scattering cross-section as taught in U.S. Pat. Nos. 5,217,804 and 5,252,444 can be used. These are present in the transparent magnetic layer in the amount from about 1 to 10 weight percent based on the weight if the binder. The magnetic particles have a urface area greater than 30 $m^2/gm$ and a coverage of from about $1\times10^{-11}$ mg/$\mu m^3$ to $1\times10^{-10}$ mg/$\mu m^3$. A dispersing agent, or wetting agent can be present to facilitate the dispersion of the magnetic particles. This helps to minimize the agglomeration of the magnetic particles. Useful dispersing agents include fatty acid amines and commercially available wetting agents such as Witco Emcol CC59 which is a quaternary amine available from Witco Chemical Corp. Rhodafac PE 510, Rhodafac RE 610, Rhodafac RE960, and Rhodafac LO529, which are phosphoric acid esters available from Rhone-Poulenc.

Fluoropolymer particles such as polytetrafluoroethylene (PTFE), fluorinated ethylene propylene (FEP), perfluoroalkoxy (PFA) are useful as the lubricant in the protective lubricating overcoat layer. Examples of such particles include fluoropolymer dispersions from ICI, such as those commercially sold under the names of AD1, AD133, AD2, AD639, AD730 and the like; Teflon dispersions sold by DuPont under the names PFA 335, Teflon FEP120, FEP121A, Teflon TE-3170, Teflon 30; Teflon fluoroadditive powders sold by DuPont under the names MP1100, MP1150, and the like. The average primary particle size of the lubricating fluoropolymers is preferably within a range of 0.01 to 0.5 μm, more preferably from 0.02 to 0.3 μm. If the particles are too small, they are ineffective for lubrication, if they are too large, they cause scattering of light and will result in loss of transparency of the layer. Typically, the fluoropolymer particles are present in the lubricating overcoat from about 10 to about 60 wt %, preferably in the amount from 20 to 40 wt % relative to the weight of the binder. The thickness of the lubricating overcoat layer is usually from 0.01 to 0.3 μm, preferably 0.02 to 0.2 μm.

In addition to the fluoropolymer particles, a soluble fluorinated polymer can be added. The soluble fluorinated polymer can be any polymer containing fluorinated groups that is soluble in the coating solvent. Such polymers that are useful for the invention are, but are not limited to, vinylidene fluoride resins sold by Elf Atochem North America Inc. under the names of Kynar 7201 (a copolymer of vinylidene fluoride and tetrafluoro ethylene), Kynar 9301 (a terpolymer of vinylidene fluoride, hexafluoro propane, and tetrafluoro ethylene); other copolymers containing vinylidene fluoride, hexafluoro propane, tetrafluoro ethane, or chlorotrifluoro ethylene, such as poly(vinylidene-fluoride-chlorotrifluoroethylene) (PVFCE), sold by Polysciences, Inc., and poly(vinylidene fluoride). Typically, the soluble fluoropolymer is present in the lubricating overcoat from about 0 to about 40 wt %, preferably in the amount from about 5 to 25 wt % relative to the weight of the binder.

Abrasive particles useful in the present invention include nonmagnetic inorganic powders with a Mohs scale hardness of not less than 6. These include, for example, metal oxides such as alpha-alumina, chromium oxide ($Cr_2O_3$), alpha-$Fe_2O_3$, silicon dioxide, alumino-silicate and titanium dioxide. Carbides such as silicone carbide and titanium carbide, nitrides such as silicon nitride, titanium nitride and diamond in fine powder may also be used. Alpha alumina and silicon dioxide are preferred. These are included to improve the head cleaning properties and improve durability of the coating. A dispersing agent, or wetting agent can be present to facilitate the dispersion of the abrasive particles. This helps to minimize the agglomeration of the particles. Useful dispersing agents include, but are not limited to, fatty acid amines and commercially available wetting agents such as Solsperse 24000 sold by Zeneca, Inc. (ICI). The abrasive particles have a median diameter of about 0.2 to 0.4 μm. The abrasive particles are present in the lubricious overcoat layer, or in both the overcoat and the transparent magnetic layer. They are present in the overcoat layer in the amount of at least 2 weight percent based on the weight of the binder so that durability of the coating is achieved and clogging of the magnetic heads is prevented. The upper limit of the amount of abrasive particles is determined by the loss of transparency of the layer, adversely affecting the photographic element, and by their abrasive effects on the magnetic heads and the tools and photographic apparatus that the film comes in contact with, leading to premature wear of these tools and apparatus. Typically, the abrasive particles are present in the transparent magnetic layer in the amount of 0 wt % to about 20 wt % relative to the weight of the binder, and are present in the lubricating overcoat from about 2 to about 25, preferably in the amount from about 6 to 16 relative to the weight of the binder in the overcoat.

Filler particles useful in the present invention have a median diameter less than 0.15 μm, preferably less than 0.1 μm. The filler particles have a Mohs hardness greater than 6 and are present in the amount from about 0 to 300 percent, most preferably in the amount from about 0 to 85 percent based on the weight of the binder. They can be present in either the transparent magnetic layer, the lubricating overcoat, or both. Examples of filler particles include nonmagnetic inorganic powders such as γ-aluminum oxide, chromium oxide, iron oxide, tin oxide, doped tin oxide, silicon dioxide, alumino-silicate, titanium dioxide, silicon carbide, titanium carbide, and diamond in fine powder, as described in U.S. Pat. No. 5,432,050. A dispersing agent, or wetting agent can be present to facilitate the dispersion of the filler particles. This helps to minimize the agglomeration of the particles. Useful dispersing agents include, but are not limited to, fatty acid amines and commercially available wetting agents such as Solsperse 24000 sold by Zeneca, Inc. (ICI). Preferred filler particles are gamma-aluminum oxide and silicon dioxide.

The binder resin of the protective overcoat layer includes any polymer having good abrasion resistance. For example, cellulose esters such as cellulose diacetates and triacetates, cellulose acetate propionate, cellulose acetate butyrate, cellulose nitrate, polyacrylates such as polymethyl methacrylate, polyphenylmethacrylate and copolymers such as with acrylic or methacrylic acid, or sulfonates, polyesters, polyurethanes, urea resins, melamine resins, urea-formaldehyde resins, polyacetals, polybutyrals, polyvinyl alcohol, epoxies and epoxy acrylates, phenoxy resins, polycarbonates, vinyl chloride-vinyl acetate copolymers, vinyl chloride-vinyl acetate-vinyl-alcohol copolymers, vinyl chloride-vinyl acetate-maleic acid polymers, vinyl chloride-vinylidene chloride copolymers, vinyl chloride-acrylonitrile copolymers, vinyl phenol polymers, phenolic resins, acrylic ester-acrylonitrile copolymers, acrylic ester-vinylidene chloride copolymers, methacrylic ester-styrene copolymers, butadiene-acrylonitrile copolymers, acrylonitrile-butadiene-acrylic or methacrylic acid copolymers, styrene-butadiene copolymers can be used as binders in either the transparent magnetic layer or the overcoat layer. Cellulose ester derivatives, such as cellulose diacetates and triacetates, cellulose acetate propionate, cellulose nitrate, and polyacrylates such as polymethyl methacrylate, polyphenylmethacrylate and copolymers with acrylic or methacrylic acid are preferred.

Optionally coating aids and surfactants useful in the protective overcoat layer include, but are not limited to, nonionic fluorinated alkyl esters such as FC-430, FC-431, FC-10, FC171 sold by Minnesota Mining and Manufacturing Co., Zonyl fluorochemicals such as Zonyl-FSN, Zonyl-FTS, Zonyl-TBS, Zonyl-BA sold by DuPont; polysiloxanes such as Dow Corning DC 1248, DC200, DC510, DC 190 and BYK 320, BYK 322, sold by BYK Chemie and SF 1079, SF102.3, SF 1054, and SF 1080 sold by General Electric; polyoxyethylene-lauryl ether surfactants sold by Kodak; sorbitan laurate, palmitate and stearates such as Span surfactants sold by Aldrich.

The present invention can also include crosslinking agents, such as organic isocyanates such as tetramethylene diisocyanate, hexamethylene diisocyanate, dicyclohexylmethane diisocyanate, isophorone diisocyanate, dimethylbenzene diisocyanate, methylcyclohexylene diisocyanate, lysine diisocyanate, tolylene diisocyanate, diphenylmethane diisocyanate, aziridines such as taught in U.S. Pat. No. 4,225,665; ehyleneimines such as Xama-7 sold by EIT Industries; blocked isocyanates such as CA BI-12 sold by Cytec Industries; melamines such as methoxymethylmelamine as taught in U.S. Pat. No. 5,198,499; alkoxysilane coupling agents including those with epoxy, amine, hydroxyl, isocyanate, or vinyl functionality; Cymel type agents like Cymel 300, Cymel 303, Cymel 1170, Cymel 1171 sold by Cytec Industries; and bis-epoxides such as Epons sold by Shell may be used to crosslink the binder in either the transparent magnetic layer or the lubricating overcoat. Polyisocyanates prepared by reacting an excess of organic diisocyanate with an active hydrogen containing compound such as polyols, polyethers and polyesters including ethylene glycol, propylene glycol, dipropylene glycol, butylene glycol, trimethylol propane, hexanetriol, glycerine, sorbitol, pentaerythritol, caster oil, ethylenediamine, hexamethylenediamine, ethanolamine, diethanolamine, triethanolamine, water, ammonia, urea and the like, can also be used. Preferred crosslinking agents are the polyisocyanate sold by Mobay under the trade name Mondur CB 75, Cymel, and bis-epoxides.

To prepare the coating solution, a suitable solvent for the binder resin, such as alcohols, for example methanol, ethanol, isopropanol, butanol, isobutyl alcohol, ketones, for example acetone, 2-butanone, cyclohexanone, cyclopentanone, esters, for example ethyl acetate, butyl acetate, methylacetoacetate, ethers, for example tetrahydrofuran, chlorinated hydrocarbons, for example methylene chloride, and toluene can be used.

The transparent magnetic oxide layer beneath the transparent lubricating layer may or may not contain abrasive particles. It may also be a composite of several layers, each containing differing or similar amounts of magnetic oxide, abrasive, or inorganic filler particles.

The transparent lubricating overcoat layer (furthest from the support) may also contain magnetic oxide particles and inorganic filler particles, although this is not necessary for the invention.

In a particularly preferred embodiment, the imaging elements of this invention are photographic elements, such as photographic films, photographic papers or photographic glass plates, in which the image-forming layer is a radiation-sensitive silver halide emulsion layer. Such emulsion layers typically comprise a film-forming hydrophilic colloid. The most commonly used of these is gelatin and gelatin is a particularly preferred material for use in this invention. Useful gelatins include alkali-treated gelatin (cattle bone or hide gelatin), acid-treated gelatin (pigskin gelatin) and gelatin derivatives such as acetylated gelatin, phthalated gelatin and the like. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water-soluble polyvinyl compounds such as polyvinyl alcohol, polyacrylamide, poly (vinylpyrrolidone), and the like.

The photographic elements of the present invention can be simple black-and-white or monochrome elements comprising a support bearing a layer of light-sensitive silver halide emulsion or they can be multilayer and/or multicolor elements.

Color photographic elements of this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art.

A preferred photographic element according to this invention comprises a support bearing at least one blue-sensitive silver halide emulsion layer having associated therewith a yellow image dye-providing material, at least one green-sensitive silver halide emulsion layer having associated therewith a magenta image dye-providing material and at least one red-sensitive silver halide emulsion layer having associated therewith a cyan image dye-providing material.

In addition to emulsion layers, the photographic elements of the present invention can contain one or more auxiliary layers conventional in photographic elements, such as overcoat layers, spacer layers, filter layers, interlayers, antihalation layers, pH lowering layers (sometimes referred to as acid layers and neutralizing layers), timing layers, opaque reflecting layers, opaque light-absorbing layers and the like. The support can be any suitable support used with photographic elements. Typical supports include polymeric films, paper (including polymer-coated paper), glass and the like. Details regarding supports and other layers of the photographic elements of this invention are contained in *Research Disclosure,* Item 36544, September, 1994.

The light-sensitive silver halide emulsions employed in the photographic elements of this invention can include coarse, regular or fine grain silver halide crystals or mixtures thereof and can be comprised of such silver halides as silver chloride, silver bromide, silver bromoiodide, silver chlorobromide, silver chloroiodide, silver chorobromoiodide, and mixtures thereof. The emulsions can be, for example, tabular grain light-sensitive silver halide emulsions. The emulsions can be negative-working or direct positive emulsions. They can form latent images predominantly on the surface of the silver halide grains or in the interior of the silver halide grains. They can be chemically and spectrally sensitized in accordance with usual practices. The emulsions typically will be gelatin emulsions although other hydrophilic colloids can be used in accordance with usual practice. Details regarding the silver halide emulsions are contained in *Research Disclosure,* Item 36544, September, 1994, and the references listed therein.

The photographic silver halide emulsions utilized in this invention can contain other addenda conventional in the photographic art. Useful addenda are described, for example, in *Research Disclosure,* Item 36544, September, 1994. Useful addenda include spectral sensitizing dyes, desensitizers, antifoggants, masking couplers, DIR couplers, DIR compounds, antistain agents, image dye stabilizers, absorbing materials such as filter dyes and UV absorbers, light-scattering materials, coating aids, plasticizers and lubricants, and the like.

Depending upon the dye-image-providing material employed in the photographic element, it can be incorporated in the silver halide emulsion layer or in a separate layer associated with the emulsion layer. The dye-image-providing material can be any-of a number known in the art, such as dye-forming couplers, bleachable dyes, dye developers and redox dye-releasers, and the particular one employed will depend on the nature of the element, and the type of image desired.

Dye-image-providing materials employed with conventional color materials designed for processing with separate solutions are preferably dye-forming couplers; i.e., compounds which couple with oxidized developing agent to form a dye. Preferred couplers which form cyan dye images are phenols and naphthols. Preferred couplers which form magenta dye images are pyrazolones and pyrazolotriazoles. Preferred couplers which form yellow dye images are benzoylacetanilides and pivalylacetanilides.

The present invention is illustrated by the following examples.

EXAMPLES OF THE INVENTION

EXAMPLE 1

The transparent magnetic layer is prepared by 1-making a dispersion of magnetic particles by mixing CSF-4085V2 (2.27 wt %) Rhodafac PE510 stabilizer (0.11 wt %), dibutyl phthalate (4.44 wt %) and cellulose triacetate (2.27 wt %) in methylene chloride (90.91 wt %) using a high shear mixer; 2- making a dispersion of the abrasive particles by mixing AKP-50 (from Sumitomo; 0.25 $\mu$m diameter; 25.54 wt %) with Solsperse 24000 stabilizer (2.5 wt %) sold by Zeneca, Inc (ICI), in methyl acetoacetate (71.96 wt %) using a high shear mixer; 3- adding the magnetic dispersion (5.73 wt %) and the abrasive particle dispersion (0.46 wt %) to a cellulose diacetate (2.8 wt %) binder dissolved in a mixture of methylene chloride (62.39 wt %), acetone (24.08 wt %), and methyl acetoacetate (4.48 wt %) using a high shear mixer. A coating aid FC-431 (0.06 wt %; 3M Corporation) is added with low shear mixing. This dispersion was cast to a dry thickness of 1.2 microns onto subbed polyethylene terephthalate containing a vanadium pentoxide layer.

Subsequently, the transparent magnetic layer is overcoated with a transparent lubricating layer. This lubricating layer is the outermost layer on the side opposite from the emulsion on a photographic element. This outermost layer contains (1) a polymer binder, such as cellulose acetate polymer, polyurethane, polyester, or methacrylate polymer or copolymer (2) hard inorganic abrasive particles, such as gamma-aluminum oxide particles and (3) fluoropolymer microparticles or a mixture of fluoropolymers and fluoropolymer microparticles. The variations of each and relative amounts are listed in Table I.

To prepare the lubricating overcoat, 1.30 g of cellulose acetate CA398-3 (Eastman Chemical Co.) is dissolved in a mixture of 80.3 g of methanol, 202.1 g of acetone and 14.9 g of methyl acetoacetate. To this solution is added 0.72 g of a 54 wt % aqueous dispersion FEP-T120 (particle size of 0.2 microns, DuPont Chemical Co.) and 0.75 g of a 25 wt % dispersion of AKP-50 (aluminum oxide from Sumitomo; dispersed in methyl acetoacetate with 2.5% Solsperse 24000 sold by Zeneca, Inc (ICI)). This gives a solution that is 0.62 wt % in solids concentration. A coating aid, Fluorad FC-430 (3M Corp.) is added (optional) at 0.02 wt % of total solution. This solution is coated over the transparent magnetic layer to give a dried nominal thickness of about 0.07 microns. It should be noted that the exact layer thickness is modulated by the protrusion of abrasive and fluoropolymer particles.

The coefficient of friction (COF) of this dried package was measured using IMASS Ball Sled friction tester. In this test, the sled consists of three tungsten balls which are set in triangular geometry and contact the sample. The test sample is placed flat and the balls of the sled are placed into contact with it. The sled is mechanically driven and set into horizontal motion and the force needed to sustain movement of the two surfaces relative to each other is measured and is related to the kinetic COF. A friction value less than 0.35, preferably less than 0.26 is desirable. The durability of the coating was tested with a Pin-on-disk apparatus that monitors the contact area between a 1.5×0.6 mm ferrite cube slider and a circular shaped disk of the sample as the latter rotates at a speed of 2"/sec under a load of 15 grams. In this experiment, a light beam illuminates the contact area between the slider and the sample film so as to generate an optical interference pattern. Thus, the generation of wear debris from the layer can easily be monitored. In the following examples, this test will be referred to as the HF-POD (head-film pin-on-disk). Failure of the sample is indicated by the buildup of debris during the test. The duration of the test is 250 revolutions. The number of revolution that the sample underwent before failure occurred is indicated in the table. Failure is defined as the point at which severe debris and deterioration of the coating becomes visible. A successful coating, as defined in this invention will undergo 250 revolutions without failure. The physical performance of the coating is shown in Table I.

EXAMPLES 2–9

Table I lists similar preparations of the lubricating overcoat as described in Example 1, and the results from the testing procedures. The components of the lubricating overcoat are listed as their relative weight ratios with respect to the total solids content of the dried coating. All coating solutions were prepared as in Example 1 at a solution concentration of about 0.6 wt % solids in methanol/acetone/methylacetoacetate. Solutions prepared with CA320S required an additional 5 wt % water in the coating solution. All solutions were coated over the transparent magnetic layer of Example 1.

COMPARATIVE EXAMPLES 10–14

These transparent overcoats were prepared as described in Example 1 and coated over the transparent magnetic layer of Example 1, however, the overcoat does not contain abrasive particles. This results in early failure of the coatings in the HF-POD test, as shown in Table I.

TABLE I

Overcoats containing fluoropolymer particles and abrasive particles over the transparent magnetic oxide layer of Example 1

| Ex (*) | Binder | wt % binder relative to total solids | mg/sft binder | Fluoro-polymer particles | wt % fluoro-polymer particles relative to total solids | wt % AKP-50 relative to total solids | COF | HF-POD (number of revolutions to failure) |
|---|---|---|---|---|---|---|---|---|
| 1 | CA398-3 | 69.2 | 6.9 | FEP-T120 | 20.8 | 10.0 | 0.22 | 250 |
| 2 | CA398-3 | 74.0 | 7.2 | FEP-T120 | 25.0 | 10.0 | 0.28 | 250 |
| 3 | CA398-3 | 63.0 | 6.3 | FEP-T120 | 31.7 | 5.0 | 0.22 | 250 |

TABLE I-continued

Overcoats containing fluoropolymer particles and abrasive particles over the transparent magnetic oxide layer of Example 1

| Ex (*) | Binder | wt % binder relative to total solids | mg/sft binder | Fluoro-polymer particles | wt % fluoro-polymer particles relative to total solids | wt % AKP-50 relative to total solids | COF | HF-POD (number of revolutions to failure) |
|---|---|---|---|---|---|---|---|---|
| 4 | CA398-3 | 81.1 | 15.0 | FEP-T120 | 13.5 | 5.4 | 0.22 | 250 |
| 5 | CA398-3 | 62.5 | 10.0 | FEP-T120 | 31.3 | 6.2 | 0.21 | 250 |
| 6 | CA398-30 | 65.0 | 6.5 | FEP-T120 | 25.0 | 10.0 | 0.21 | 250 |
| 7 | CA320S | 69.2 | 6.9 | FEP-T120 | 20.8 | 10.0 | 0.26 | 250 |
| 8 | CA320S | 73.0 | 7.3 | FEP-T120 | 25.0 | 2.0 | 0.35 | 250 |
| 9 | CA320S | 74.0 | 10.0 | FEP-T120 | 18.5 | 7.5 | 0.23 | 250 |
| CE10 | CA320S | 70.0 | 7.0 | FEP-T120 | 30.0 | 0 | 0.31 | 4 |
| CE11 | CA320S | 50.0 | 5.0 | FEP-T120 | 50.0 | 0 | 0.29 | <15 |
| CE12 | CA320S | 30.0 | 3.0 | FEP-T120 | 70.0 | 0 | 0.31 | 1 |
| CE13 | CA320S | 71.5 | 20.0 | FEP-T120 | 28.5 | 0 | 0.48 | 40 |
| CE14 | CA398-3 | 70.0 | 7.0 | FEP-T120 | 30.0 | 0 | 0.30 | 3 |

(*) CE are comparative examples
CE demonstrate the necessity of abrasive particles

EXAMPLE 15

The lubricious overcoat is prepared by dissolving 0.38 g of cellulose acetate CA398-3 (Eastman Chemical Co.) in a mixture of 283.8 g of acetone and 14.9 g of methyl acetoacetate. To this solution is added 0.47 g of a dried fine particulate (20 nm size) PTFE powder, TLF8484, (DuPont Chemical Co.) and sonicated for 15 minutes. Then 0.38 g of a 25 wt % dispersion of AKP-50 (aluminum oxide from Sumitomo; dispersed in methyl acetoacetate with 2.5% Solsperse 24000 sold by Zeneca, Inc (ICI) was added to the solution. This solution is coated over the transparent magnetic layer of Example 1 to give a dried thickness of about 0.03 microns.

The coefficient of friction (COF) of this dried package was measured using IMASS Ball Sled. The durability of the coating was tested with the HF-POD. These are reported in Table II.

EXAMPLES 16–18

Table II lists similar preparations to that described in Example 15, and the results from the testing procedures, using other types of fine PTFE powders such as MP1150 and MP1100 (0.2 micron size particles from DuPont Chemical Co.).

EXAMPLE 19

To prepare the transparent lubricious overcoat, 4.059 g of cellulose acetate CA398-3 (Eastman Chemical Co.) is dissolved in a mixture of (132.7 g of methanol, 334.1 g of acetone and 24.6 g of methyl acetoacetate). To this solution is added 0.38 g of a soluble fluoropolymer Kynar 7201 (Elf Atochem North America Inc.), 2.86 of a 54 wt % aqueous dispersion FEP-T120 (particle size of 0.2 microns, DuPont Chemical Co.) and 1.39 g of a 45 wt % dispersion of AKP-50 (aluminum oxide from Sumitomo; dispersed in methyl acetoacetate with 3% Solsperse 24000 sold by Zeneca, Inc (ICI)). A coating aid, Fluorad FC-430 (3M Corp.) is added (optional) at 0.02 wt % of total solution. This solution is coated onto the transparent magnetic layer of Example 1 to give a dried thickness of about 0.12 microns. The performance data is listed in Table III.

EXAMPLES 20–28

Table III lists the performance of other transparent lubricious overcoat compositions prepared in a similar way to that in Example 19, and coated over the transparent magnetic layer of Example 1.

COMPARATIVE EXAMPLES 29–30

These transparent overcoats were prepared as described in Example 19 and coated over the transparent magnetic layer

TABLE II

Overcoats of fluoropolymer particles (powders) and abrasive particles over the transparent magnetic oxide layer of Example 1

| Ex | Binder | wt % binder relative to total solids | mg/sft binder | Fluoro-polymer particles | wt % fluoropolymer particles relative to total solids | wt % AKP-50 relative to total solids | COF | HF-POD |
|---|---|---|---|---|---|---|---|---|
| 15 | CA398-3 | 40.0 | 2.0 | TLF8484 | 50.0 | 10.0 | 0.18 | 250 |
| 16 | CA398-3 | 65.0 | 6.5 | MP1150 | 25.0 | 10.0 | 0.23 | 250 |
| 17 | CA320S | 65.0 | 6.5 | MP1150 | 25.0 | 10.0 | 0.26 | 250 |
| 18 | CA320S | 65.0 | 6.5 | MP1100 | 25.0 | 10.0 | 0.22 | 250 |

of Example 1, however, the overcoat does not contain fluoropolymer particles. This results in early failure of the coatings in the HF-POD test, or high friction coefficient, as shown in Table III.

To prepare the lubricating overcoat, 1.62 g of Mm-AA copolymer containing about 5 mol % methacrylic acid is dissolved in a mixture of 29.7 g of methanol, 252.2 g of acetone and 14.8 g of methyl acetoacetate. To this solution

TABLE III

Overcoats containing fluoropolymer particles, abrasive particles, and a soluble fluoropolymer over the transparent magnetic oxide layer of Example 1

| Ex (*) | Binder | wt % binder relative to total solids | mg/sft binder | Fluoro-polymer particles | wt % fluoro-polymer particles relative to total solids | Soluble fluoro-polymer | wt % sol fluoro-polymer relative to total solids | wt % AKP-50 relative to total solids | COF | HF-POD (number of revolutions to failure) |
|---|---|---|---|---|---|---|---|---|---|---|
| 19 | CA398-3 | 61.3 | 6.5 | FEP-T120 | 23.6 | Kynar 7201 | 5.7 | 9.4 | 0.20 | 250 |
| 20 | CA398-3 | 45.7 | 4.8 | FEP-T120 | 23.8 | Kynar 7201 | 21.0 | 9.5 | 0.20 | 250 |
| 21 | CA398-3 | 59.1 | 6.5 | FEP-T120 | 22.7 | Kynar 9301 | 9.1 | 9.1 | 0.22 | 250 |
| 22 | CA398-3 | 61.3 | 6.5 | FEP-T120 | 23.6 | PVFCE | 5.7 | 9.4 | 0.26 | 250 |
| 23 | CA398-3 | 59.1 | 6.5 | FEP-T120 | 22.7 | PVFCE | 9.1 | 9.1 | 0.26 | 250 |
| 24 | CA320S | 61.3 | 6.5 | FEP-T120 | 23.6 | Kynar 7201 | 5.7 | 9.4 | 0.24 | 250 |
| 25 | CA320S | 56.0 | 6.5 | FEP-T120 | 21.6 | Kynar 7201 | 5.2 | 17.2 | 0.21 | 250 |
| 26 | CA320S | 50.0 | 6.5 | FEP-T120 | 19.2 | Kynar 7201 | 23.1 | 7.7 | 0.23 | 250 |
| 27 | CA398-3 | 59.1 | 6.5 | MP1150 | 22.7 | Kynar 7201 | 9.1 | 9.1 | 0.19 | 250 |
| 28 | CA320S | 59.1 | 6.5 | MP1150 | 22.7 | Kynar 7201 | 9.1 | 9.1 | 0.20 | 250 |
| CE29 | CA398-3 | 37.5 | 3.0 | none | — | Kynar 7201 | 50.0 | 12.5 | 0.27 | <25 |
| CE30 | CA398-3 | 65.0 | 6.5 | none | — | Kynar 9301 | 25.0 | 10.0 | 0.42 | 250 |

(*) CE are comparative examples
CE demonstrate the necessity for fluoropolymer particles

EXAMPLES 31–32

The transparent lubricious overcoat is prepared as described in Example 1 and coated over a transparent magnetic layer that was prepared as described in Example 1, however, without adding the AKP-50 abrasive particles to the magnetic layer. The compositions of the lubricious overcoat and its performance are listed in Table IV.

COMPARATIVE EXAMPLE 33

These transparent overcoat and magnetic layer were prepared as described in Example 31, however, the overcoat does not contain fluoropolymer particles. This results in high friction coefficient, as shown in Table IV.

is added 1.14 g of a 54 wt % aqueous dispersion FEP-T120 (particle size of 0.2 microns, DuPont Chemical Co.) and 0.56 g of a 45 wt % dispersion of AKP-50 (aluminum oxide from Sumitomo; dispersed in methyl acetoacetate with 3% Solsperse 24000 sold by Zeneca, Inc (ICI)). This gives a solution that is 0.83 wt % in solids concentration. A coating aid, Fluorad FC-430 (3M Corp.) is added (optional) at 0.02 wt % of total solution. This solution is coated over the transparent magnetic layer to give a dried nominal thickness of about 0.07 microns. It should be noted that the exact layer thickness is modulated by the protrusion of abrasive and fluoropolymer particles.

The performance of the coating is shown in Table V.

TABLE IV

Overcoats containing fluoropolymer particles and abrasive particles over the transparent magnetic oxide layer containing no abrasives of Example 31

| Ex (*) | Binder | wt % binder relative to total solids | mg/sft binder | Fluoro-polymer particles | wt % fluoro-polymer particles relative to total solids | wt % AKP-50 relative to total solids | COF | HF-POD (number of revolutions to failure) |
|---|---|---|---|---|---|---|---|---|
| 31 | CA398-3 | 66.7 | 6.5 | FEP-T120 | 25.3 | 8.0 | 0.23 | 250 |
| 32 | CA398-30 | 65.0 | 6.5 | FEP-T120 | 25.0 | 10.0 | 0.23 | 250 |
| CE33 | CA398-3 | 86.7 | 6.5 | none | 0 | 13.5 | 0.50 | not done |

(*) CE are comparative examples
CE demonstrate the necessity for fluoropolymer particles

EXAMPLE 34

The transparent magnetic layers is prepared as in Example 1 except that the binder polymer is a poly(methyl methacrylate-methacrylic acid) copolymer (Mm-AA) containing about 5 mol % methacrylic acid.

EXAMPLES 35–36

Table V lists the performance of other transparent lubricious overcoat compositions prepared in a similar way to that in Example 34, and coated over the transparent magnetic layer of Example 34.

EXAMPLE 37

Table V lists the performance of other transparent lubricious overcoat compositions prepared in a similar way to that in Example 1, and coated over the transparent magnetic layer of Example 34.

COMPARATIVE EXAMPLE 38

These transparent overcoat and magnetic layers were prepared as described in Example 31, however, the overcoat does not contain abrasive particles. This results in early failure of the coating as determined by the HF-POD test and shown in Table V.

consisting of copolymers of vinylidene fluoride and tetrafluoro ethylene; terpolymers of vinylidene fluoride, hexafluoro propane, and tetrafluoro ethylene; and copolymers containing vinylidene fluoride, hexafluoro propane, tetrafluoro ethane, or chlorotrifluoro ethylene.

7. The photographic element of claim 5 wherein the the soluble fluorinated polymer is present in the protective lubricating overcoat layer from about 0 to about 40 wt % relative to the weight of the transparent binder.

8. The photographic element of claim 1, wherein the abrasive particles are present in the lubricating overcoat from about 2 to about 25 weight percent relative to the weight of the tranparent binder.

TABLE V

Overcoats containing fluoropolymer particles and abrasive particles over the transparent magnetic oxide layer of Example 34

| Ex (*) | Binder | wt % binder relative to total solids | mg/sft binder | Fluoro-polymer particles | wt % fluoro-polymer particles relative to total solids | Soluble fluoro-polymer | wt % sol fluoro-polymer relative to total solids | wt % AKP-50 relative to total solids | COF | HF-POD (number of revolutions to failure) |
|---|---|---|---|---|---|---|---|---|---|---|
| 34 | Mm-AA | 65.0 | 6.5 | FEP-T120 | 25.0 | none | — | 10.0 | 0.22 | 250 |
| 35 | Mm-AA | 59.1 | 6.5 | FEP-T120 | 22.7 | Kynar 7201 | 9.1 | 9.1 | 0.26 | 250 |
| 36 | Mm-AA | 50.0 | 6.5 | FEP-T120 | 19.2 | Kynar 7201 | 23.1 | 7.7 | 0.19 | 250 |
| 37 | CA398-3 | 61.3 | 6.5 | FEP-T120 | 23.6 | Kynar 7201 | 5.7 | 9.4 | 0.15 | 250 |
| CE38 | Mm-AA | 72.2 | 6.5 | FEP-T120 | 27.8 | none | — | 0 | 0.24 | 20 |

(*) CE are comparative examples
CE demonstrate the necessity for abrasive particles The invention has been described in detail with particular reference to certain preferred embodiments thereof, but it will be understood that variations and modifications can be effected within the spirit and scope of the invention.

What is claimed is:

1. A photographic element comprising:

a polyester film support, at least one light-sensitive silver halide layer on a front side of the support, an antistatic layer on a backside of the support;

a transparent magnetic recording layer on the backside of the support; and a protective lubricating overcoat layer on the backside of the support, the antistatic layer being closest to the support and the overcoat layer being furthest from the support, the protective lubricating overcoat layer comprising:

fluorinated ethylene polymer particles having a mean particle size of from 0.01 to 0.5 μm, abrasive particles having a Mohs scale hardness of 6 or more and a median diameter of from 0.1 to 0.4 μm, and a transparent binder.

2. The photographic element of claim 1, wherein the lubricating particles comprise fluorinated ethylene-propylene polymer particles.

3. The photographic element of claim 1, wherein the lubricating particles comprise polytetrafluoroethylene polymer particles.

4. The photographic element of claim 1, wherein the lubricating particles have a mean particles size of from 0.01 μm to less than 0.3 μm.

5. The photographic element of claim 1, wherein the protective lubricating overcoat layer further comprises a soluble fluorinated polymer.

6. The photographic element of claim 5 wherein the soluble fluorinated polymer in selected from the group 9. The photographic element of claim 1, wherein the transparent binder is selected from the group consisting of cellulose esters, cellulose acetate propionate, cellulose acetate butyrate, cellulose diacetate, cellulose triacetate, cellulose nitrate, polyacrylates, polymethacrylates, copolymers of polymethacrylates, sulfonates, polyesters, polyurethanes, urea resins, melamine resins, urea-formaldehyde resins, polyacetals, polybutyrals, polyvinyl alcohol, epoxies, epoxy acrylates, phenoxy resins, polycarbonates, vinyl chloride-vinyl acetate copolymers, vinyl chloride-vinyl acetate-vinyl-alcohol copolymers, vinyl chloride-vinyl acetate-maleic acid polymers, vinyl chloride-vinylidene chloride copolymers, vinyl chloride-acrylonitrile copolymers, vinyl phenol polymers, phenolic resins, acrylic ester-acrylonitrile copolymers, acrylic ester-vinylidene chloride copolymers, methacrylic ester-styrene copolymers, butadiene-acrylonitrile copolymers, acrylonitrile-butadiene-acrylic copolymers, acrylonitrile-butadiene-methacrylic acid copolymers, and styrene-butadiene copolymers.

10. The photographic element of claim 1, wherein the transparent binder is crosslinked.

11. The photographic element of claim 1, wherein the magnetic layer comprises a transparent polymeric binder and ferromagnetic particles having a surface area greater than 30 $m^2$/gm and a coverage of from about $1\times10^{-11}$ mg/$\mu m^3$ to $1\times10^{-10}$ mg/$\mu m^3$.

12. The photographic element of claim 11, wherein the magnetic layer further comprises abrasive particles.

13. The photographic element of claim 1, wherein said antistatic layer comprises a dispersion in a film-forming binder of fine particles of an electrically conducting metal antimonate.

14. The photographic element of claim 1, wherein said antistatic layer comprises vanadium pentoxide in an amount sufficient to function as an antistatic agent.

* * * * *